United States Patent
Shirahige

(10) Patent No.: US 11,646,486 B2
(45) Date of Patent: May 9, 2023

(54) ANTENNA DEVICE

(71) Applicant: DENSO TEN Limited, Kobe (JP)

(72) Inventor: Kenta Shirahige, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 393 days.

(21) Appl. No.: 16/794,305

(22) Filed: Feb. 19, 2020

(65) Prior Publication Data

US 2020/0381813 A1 Dec. 3, 2020

(30) Foreign Application Priority Data

May 27, 2019 (JP) .............................. JP2019-098551

(51) Int. Cl.
*H01Q 1/42* (2006.01)
*G01S 7/02* (2006.01)
*G01S 7/03* (2006.01)
*H01Q 1/32* (2006.01)

(52) U.S. Cl.
CPC .............. *H01Q 1/42* (2013.01); *G01S 7/025* (2013.01); *G01S 7/032* (2013.01); *H01Q 1/3233* (2013.01)

(58) Field of Classification Search
CPC ........ H01Q 1/42; H01Q 1/3233; G01S 7/025; G01S 7/032
See application file for complete search history.

(56) References Cited

U.S. PATENT DOCUMENTS

| 11,046,800 B2 | 6/2021 | Takahashi et al. |
| 2007/0241962 A1* | 10/2007 | Shinoda ................. H01Q 1/425 342/361 |
| 2012/0044113 A1* | 2/2012 | Satoh ................... H01Q 9/0407 343/893 |
| 2017/0346176 A1* | 11/2017 | Linn ................... H01Q 15/0066 |
| 2017/0346177 A1* | 11/2017 | Nagata ................. H01Q 21/065 |

FOREIGN PATENT DOCUMENTS

| JP | 2001-127523 A | 5/2001 |
| JP | 2004-138415 A | 5/2004 |
| WO | 2005-055366 A1 | 6/2005 |

* cited by examiner

*Primary Examiner* — Peter M Bythrow
(74) *Attorney, Agent, or Firm* — Maier & Maier, PLLC

(57) ABSTRACT

An antenna device includes: an antenna configured to radiate a radio wave; a substrate at which the antenna is provided; and a cover which covers the substrate from a radiation surface side of the antenna, the cover is a dielectric material, a maximum distance between the cover and the substrate in a normal direction to the substrate is smaller than ½ of a free space wavelength of the radio wave, and a thickness of the cover is smaller than ½ of an effective wavelength of the radio wave in the cover.

14 Claims, 7 Drawing Sheets

ANTENNA DEVICE

CROSS-REFERENCE TO RELATED APPLICATIONS

This application is based on and claims priority under 35 USC 119 from Japanese Patent Application No. 2019-098551 filed on May 27, 2019.

TECHNICAL FIELD

The present invention relates to an antenna device.

BACKGROUND ART

An antenna device is widely known which uses a structure including a cover that covers a substrate from a radiation surface side of the antenna so as to protect an antenna provided at the substrate (for example, see International Publication No. WO 2005/055366). In the antenna device mounted at a radar device, the cover is generally referred to as a radome.

SUMMARY OF INVENTION

In the above-described antenna device including the cover, the cover may adversely affect a radiation pattern of the antenna device, and the radiation pattern may be distorted. For example, in the antenna device mounted at the radar device, as the distortion of the radiation pattern becomes larger, angular resolution of the radar device and a minimum detection distance of the radar device become lower.

An aspect of the present invention provides an antenna device capable of preventing a radiation pattern from being distorted.

An antenna device according to an aspect of the present invention comprises: an antenna configured to radiate a radio wave; a substrate at which the antenna is provided; and a cover configured to cover the substrate from a radiation surface side of the antenna, wherein the cover is a dielectric material, wherein a maximum distance between the cover and the substrate in a normal direction of the substrate is smaller than ½ of a free space wavelength of the radio wave, and wherein a thickness of the cover is smaller than ½ of an effective wavelength of the radio wave in the cover (first configuration).

It may be that the antenna device according to the first configuration further comprises an interposition member interposed between the cover and the substrate, wherein a dielectric constant of the interposition member is different from both a dielectric constant of the substrate and a dielectric constant of the cover, and wherein a maximum distance between the cover and the substrate in the normal direction of the substrate is smaller than ½ of an effective wavelength of the radio wave in the interposition member (second configuration).

It may be that the antenna device according to the first configuration further comprises a ground pattern provided at the substrate, wherein a maximum distance between the cover and the ground pattern in the normal direction of the substrate is smaller than ½ of a free space wavelength of the radio wave (third configuration).

It may be that the antenna device according to the third configuration further comprises an interposition member interposed between the cover and the substrate, wherein a dielectric constant of the interposition member is different from both a dielectric constant of the substrate and a dielectric constant of the cover, and wherein a maximum distance between the cover and the ground pattern in the normal direction of the substrate is smaller than ½ of an effective wavelength of the radio wave in the interposition member (fourth configuration).

It may be that, in the antenna device according to the first configuration, the substrate includes a covered surface covered with the cover and an opposite surface opposite to the covered surface, and a maximum distance between the cover and the opposite surface in the normal direction of the substrate is smaller than ½ of a free space wavelength of the radio wave (fifth configuration).

It may be that the antenna device according to the fifth configuration further comprises an interposition member interposed between the cover and the substrate, wherein a dielectric constant of the interposition member is different from both a dielectric constant of the substrate and a dielectric constant of the cover, and wherein a maximum distance between the cover and the opposite surface in the normal direction of the substrate is smaller than ½ of an effective wavelength of the radio wave in the interposition member (sixth configuration).

It may be that, in the antenna device according to any one of the first to sixth configurations, the antenna device is an in-vehicle antenna device, and the antenna is a vertically polarized antenna (seventh configuration).

According to the antenna device of the present invention, the radiation pattern can be prevented from being distorted.

DETAILED DESCRIPTION OF THE INVENTION

Hereinafter, an exemplary embodiment of the present invention will be described in detail with reference to the drawings. In the present specification, "parallel" may not be strictly parallel, and may be regarded as parallel in consideration of a design error, a variation, and the like. In the present specification, "vertical" may not be strictly vertical, and may be regarded as vertical in consideration of a design error, a variation, and the like.

Figure 1:
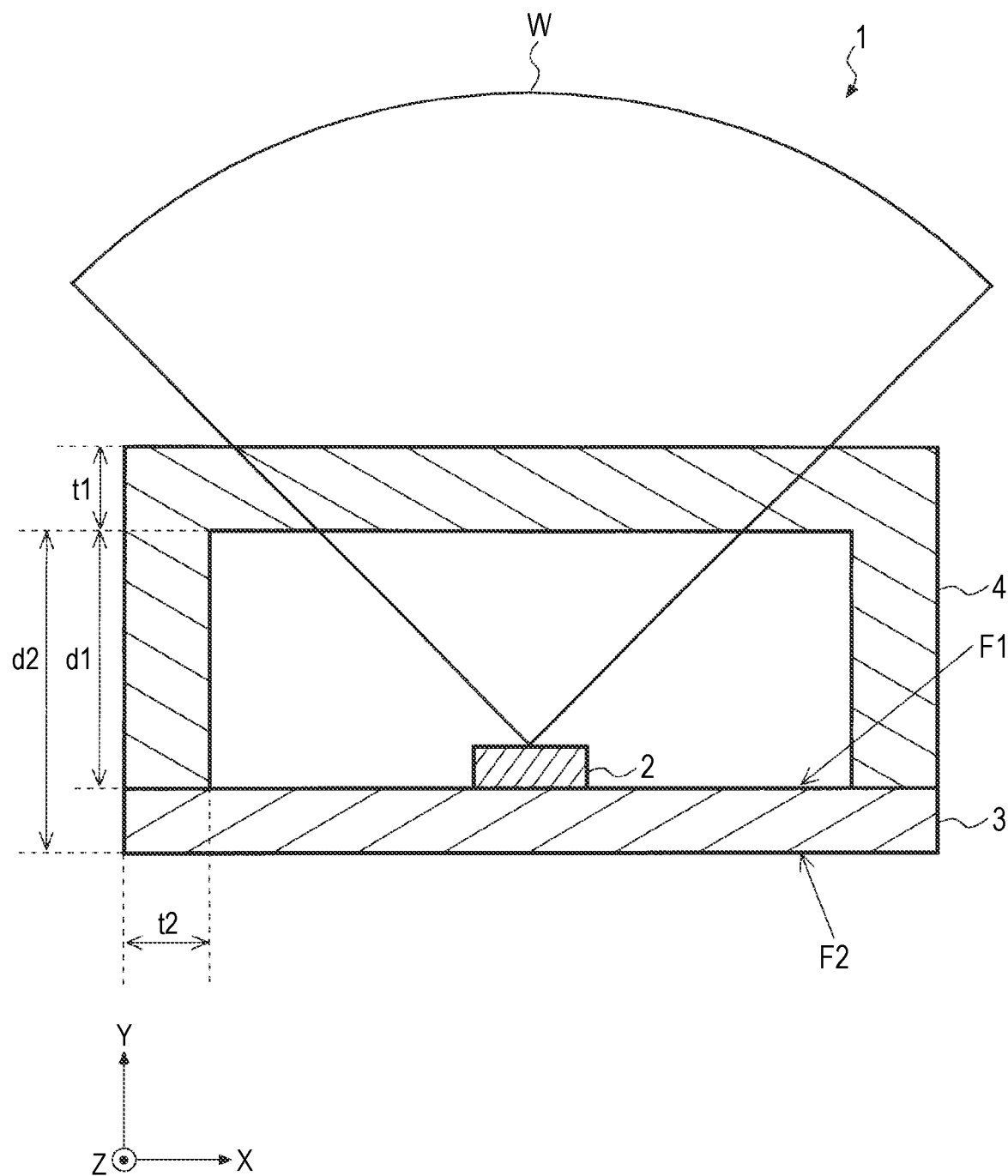
FIG. 1 is a schematic sectional view of an antenna device according to an embodiment.

FIG. 1 is a schematic sectional view of an antenna device according to the embodiment. In FIG. 1, orthogonal coordinates of an X axis, a Y axis, and a Z axis are also shown so as to facilitate understanding of a description. The orthogonal coordinates may also be shown in other drawings used in the following description.

An antenna device 1 illustrated in FIG. 1 includes a transmission antenna 2, a substrate 3, and a cover 4.

The transmission antenna 2 is configured to radiate a radio wave W. The radio wave W radiated from the transmission antenna 2 is radiated to an outside of the antenna device 1 through the cover 4.

An electric field component of the radio wave W propagates with an amplitude in a direction parallel to the Z axis. Unlike the present embodiment, the transmission antenna 2 may radiate a radio wave whose electric field component propagates with an amplitude in a direction not parallel to the Z axis. However, in this case, an effect of preventing a radiation pattern from being distorted is weakened as compared with that of the present embodiment.

One transmission antenna 2 is illustrated in FIG. 1. However, the number of transmission antennas 2 provided in the antenna device 1 may be one or plural. The transmission antenna 2 is provided at the substrate 3.

As the transmission antenna 2, for example, a radiation element of a microstrip antenna may be used. When the transmission antenna 2 is the radiation element of the microstrip antenna, a ground pattern facing the radiation element is provided on the substrate 3. For example, a slot antenna may be formed in the substrate 3, and the slot antenna may be used as the transmission antenna 2.

A distance to a target, an azimuth (an angle) of the target, a relative speed of the target, and the like may be detected by a reception antenna receiving a reflected wave. The reflected wave is obtained by the target reflecting the radio wave W radiated from the antenna device 1. The reception antenna may be provided in the antenna device 1 or may be provided outside the antenna device 1. The transmission antenna 2 may also serve as the reception antenna. Thus, the transmission antenna 2 may be a transmission and reception antenna configured to transmit the radio wave W and to receive the reflected wave.

The substrate 3 is formed of a dielectric material which is resin or Teflon (registered trademark), for example. The substrate 3 includes a covered surface F1 covered with the cover 4 and an opposite surface F2 opposite to the covered surface F1. The covered surface F1 and the opposite surface F2 are outer surfaces of the substrate 3. A normal direction of the substrate 3, more specifically, normal directions of the covered surface F1 and the opposite surface F2 are parallel to the Y axis.

The cover 4 is configured to cover the substrate 3 from a radiation surface side of the transmission antenna 2. The cover 4 is a protection member configured to protect the transmission antenna 2 from natural environment which is wind, rain, sand, and the like. The cover 4 is formed of a dielectric material which is glass fiber or Teflon, for example. Air is present in a space surrounded by the cover 4 and the covered surface F1 of the substrate 3 except for a region occupied by an element which is the antenna 2 or the like provided on the covered surface F1 of the substrate 3.

A maximum distance d1 (hereinafter, abbreviated as a "distance d1") between the cover 4 and the substrate 3 in the normal direction of the substrate 3 is smaller than ½ of a free space wavelength $\lambda$ of the radio wave W. Accordingly, the distance d1 is smaller than a cutoff wavelength of the radio wave W propagating along the X axis between the cover 4 and the substrate. As a result, the radio wave W may be prevented from propagating along the X axis between the cover 4 and the substrate.

If a part of the radio wave W propagating along the X axis between the cover 4 and the substrate leaks to the outside of the antenna device 1 in a direction including a positive direction component of the Y axis, a radiation pattern of the antenna device 1 is distorted. The antenna device 1 may prevent the radio wave W from propagating along the X axis between the cover 4 and the substrate as described above, so that the antenna device 1 may prevent a radiation pattern in a direction parallel to the X axis from being distorted.

For example, when the cover 4 has a hemispherical shape unlike the present embodiment, a distance between a vertex of a hemisphere and the substrate 3 is the distance d1.

A thickness t1 of the cover is smaller than ½ of an effective wavelength $\lambda g$ of the radio wave W in the cover 4. The effective wavelength is a wavelength of a radio wave when the radio wave propagates through a medium. Accordingly, the thickness t1 is smaller than a cutoff wavelength of the radio wave W propagating along the X axis inside the cover 4. As a result, the radio wave W may be prevented from propagating along the X axis inside the cover 4.

If a part of the radio wave W propagating along the X axis inside the cover 4 leaks to the outside of the antenna device 1 in the direction including the positive direction component of the Y axis, the radiation pattern of the antenna device 1 is distorted. The antenna device 1 may prevent the radio wave W from propagating along the X axis inside the cover 4 as described above, so that the antenna device 1 may prevent the radiation pattern in the direction parallel to the X axis from being distorted.

Unlike the present embodiment, when a thickness of the cover 4 is not uniform, a maximum thickness excluding a thickness t2 in a direction perpendicular to the Y axis may be smaller than ½ of the effective wavelength $\lambda g$ of the radio wave W in the cover 4. If a characteristic of the propagation of the radio wave W along the X axis inside the cover 4 in a case in which the cover 4 has a laminated structure cannot be regarded as equivalent to that in a case in which the cover 4 has a single layer structure, each layer of the laminated structure is considered as a separate cover, and a thickness of each cover may be smaller than ½ of the effective wavelength $\lambda g$ of the radio wave W in the cover 4.

Figure 2:
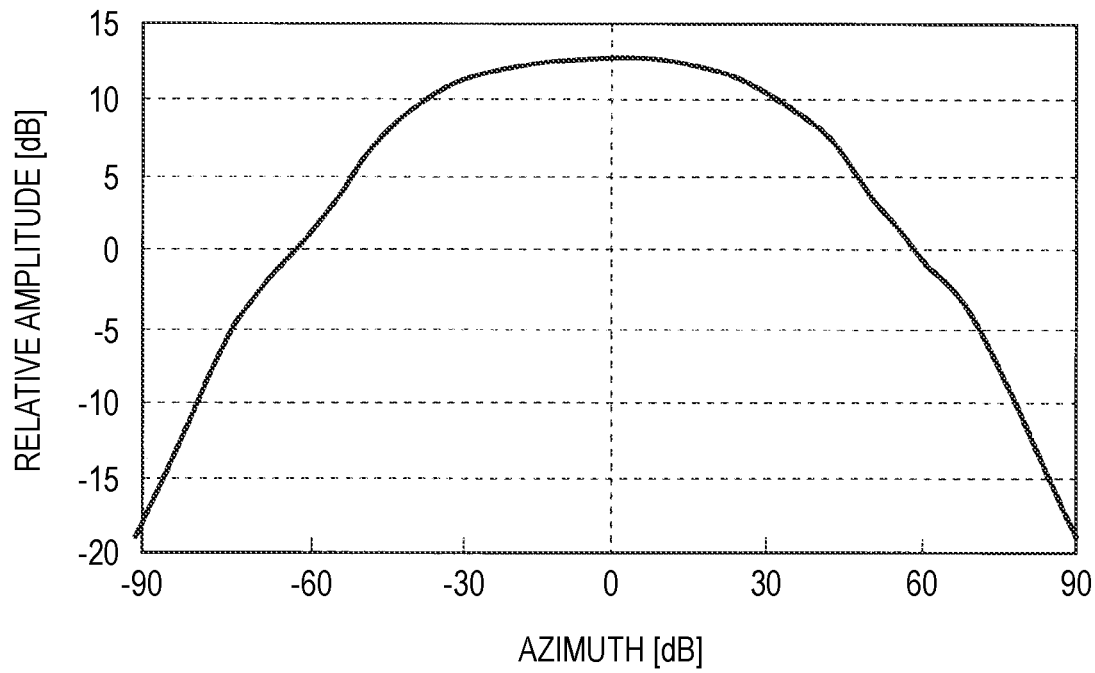
FIG. 2 shows an example of a radiation pattern of the antenna device shown in FIG. 1.
Figure 3:
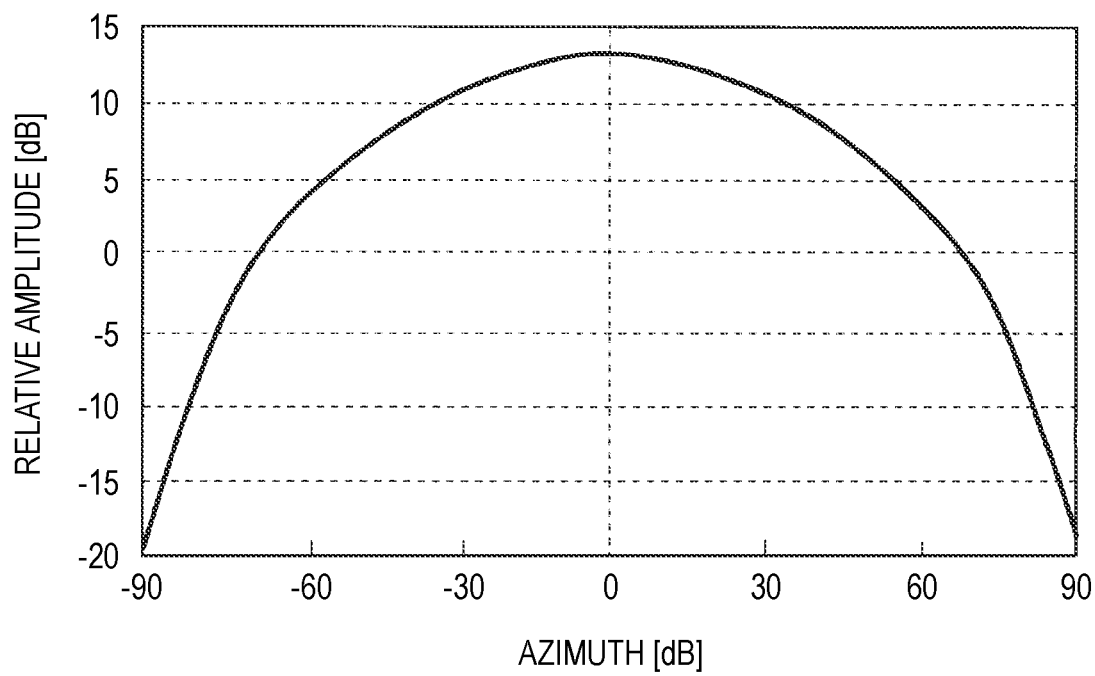
FIG. 3 shows a radiation pattern according to a first reference example.

FIG. 2 shows an example of the radiation pattern of the antenna device 1 in the direction parallel to the X axis. The radiation pattern shown in FIG. 2 is almost not distorted, and has a characteristic close to that of a radiation pattern (a radiation pattern according to the first reference example shown in FIG. 3) of an antenna device (an antenna device having a structure in which the cover 4 is removed from the antenna device 1) not including a cover.

For example, when the antenna device 1 is an in-vehicle antenna device and is mounted at an in-vehicle radar device, the antenna device 1 is mounted in a vehicle which is an automobile or the like such that the X axis and the Y axis are horizontal with respect to a ground and the Z axis is perpendicular to the ground. As described above, the transmission antenna 2 is configured to radiate the radio wave W whose electric field component propagates with an amplitude in a direction parallel to the Z axis, so that the transmission antenna 2 is a vertically polarized antenna when the antenna device 1 is mounted in the vehicle which is the automobile or the like such that the Z axis is perpendicular to the ground. With this configuration, for example, angular resolution of the in-vehicle radar device in the horizontal direction and a minimum detection distance of the in-vehicle radar device in the horizontal direction may be improved.

Figure 4:
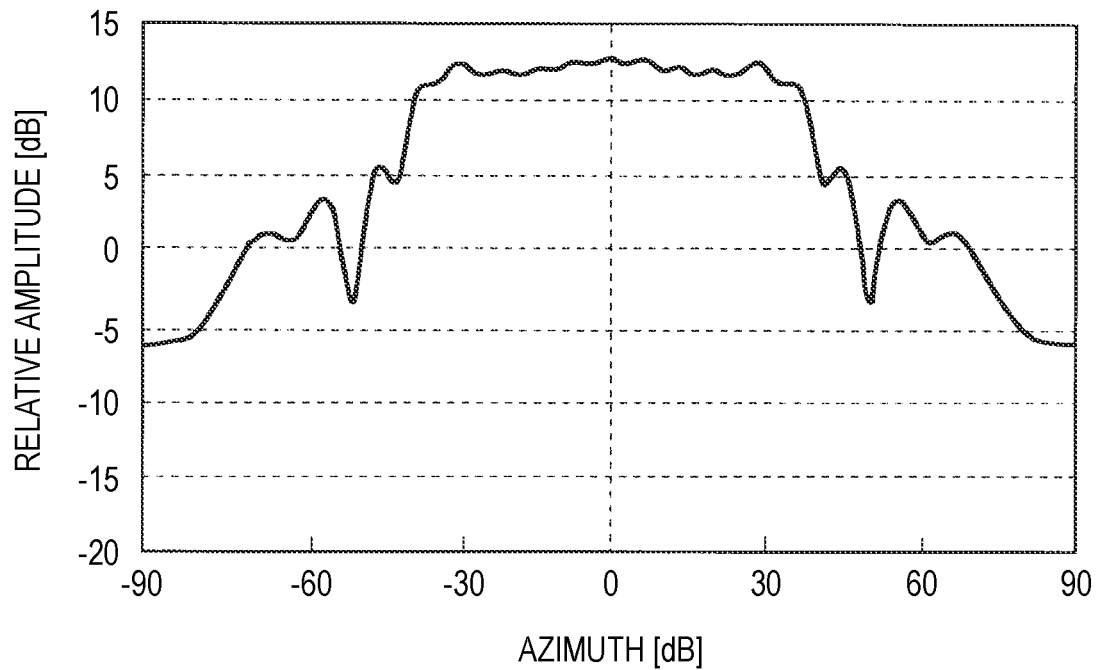
FIG. 4 shows a radiation pattern according to a second reference example.
Figure 5:
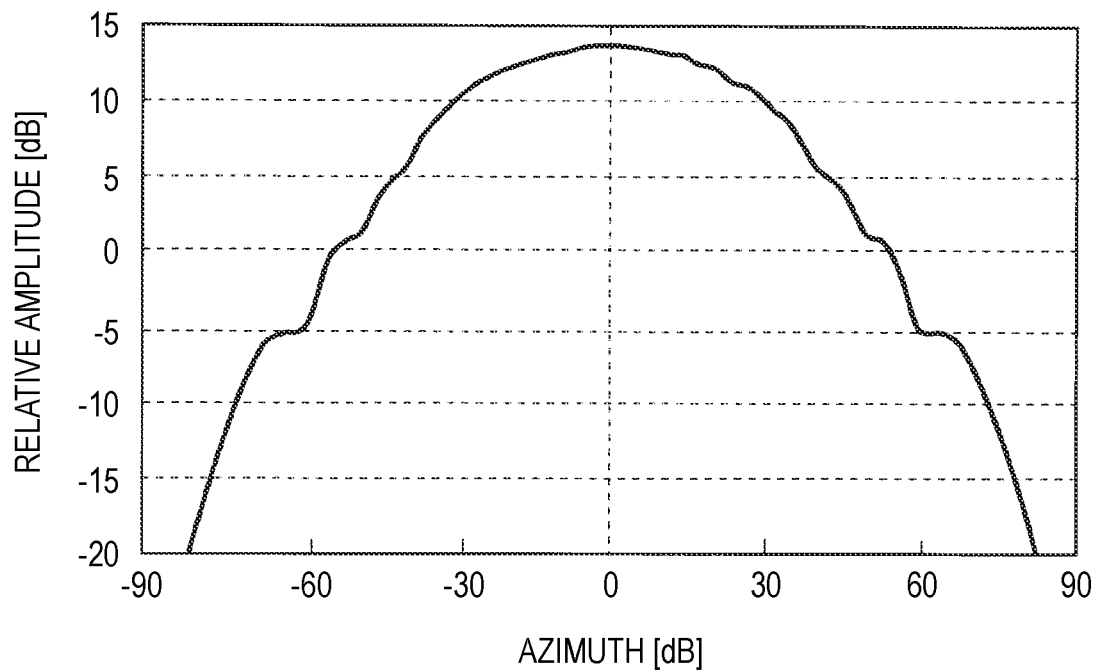
FIG. 5 shows a radiation pattern according to a third reference example.
Figure 6:
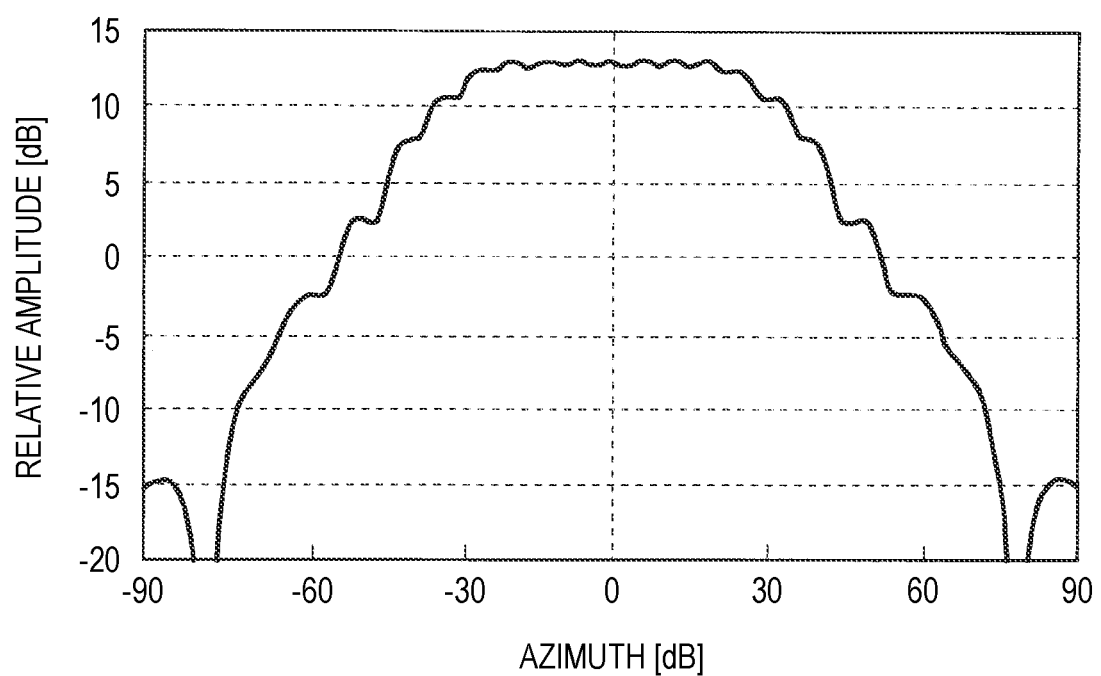
FIG. 6 shows a radiation pattern according to a fourth reference example.

FIGS. 4 to 6 shows radiation patterns according to second to fourth reference examples. In the radiation patterns according to the second to the fourth reference examples shown in FIGS. 4 to 6, distortions cannot be sufficiently prevented.

The radiation pattern according to the second reference example shown in FIG. 4 is an example of a case in which the distance d1 is larger than ½ of the free space wavelength λ of the radio wave W and the thickness t1 of the cover 4 is larger than ½ of the effective wavelength λg of the radio wave W in the cover 4. The radiation pattern according to the third reference example shown in FIG. 5 is an example of a case in which the thickness t1 of the cover 4 is not changed from that of the radiation pattern according to the second reference example shown in FIG. 4 and the distance d1 is smaller than ½ of the free space wavelength λ of the radio wave W. It can be seen from FIG. 5 that the distortion may be prevented by causing the distance d1 to be smaller than ½ of the free space wavelength λ of the radio wave W, but this countermeasure alone is insufficient.

The radiation pattern according to the fourth reference example shown in FIG. 6 is another example of a case in which the distance d1 is smaller than ½ of the free space wavelength λ of the radio wave W and the thickness t1 of the cover 4 is larger than ½ of the effective wavelength λg of the radio wave W in the cover 4. The radiation pattern according to the third reference example shown in FIG. 5 and the radiation pattern according to the fourth reference example shown in FIG. 6 have different values of the thickness t1 of the cover 4.

An example of the radiation pattern shown in FIG. 2 is an example of a case in which the distance d1 is not changed from that of the radiation pattern according to the fourth reference example shown in FIG. 6 and the thickness of the cover 4 is smaller than ½ of the effective wavelength λg of the radio wave W in the cover 4. It can be seen from FIG. 2 that the distortion can be sufficiently prevented by causing the thickness of the cover 4 to be smaller than ½ of the effective wavelength λg of the radio wave W in the cover 4 in addition to causing the distance d1 to be smaller than ½ of the free space wavelength λ of the radio wave W.

For example, when a dielectric constant of the substrate 3 is relatively low and a structure (not illustrated) formed of a conductor is in contact with the opposite surface F2, the radio wave W may propagate along the X axis between the cover 4 and the structure in contact with the opposite surface F2. Therefore, a maximum distance d2 (hereinafter, abbreviated as a "distance d2") between the cover 4 and the opposite surface F2 in the normal direction of the substrate 3 is preferably smaller than ½ of the free space wavelength λ of the radio wave W. Accordingly, the distance d2 is smaller than a cutoff wavelength of the radio wave W propagating along the X axis between the cover 4 and the structure in contact with the opposite surface F2. As a result, the radio wave W may be prevented from propagating along the X axis between the cover 4 and the structure in contact with the opposite surface F2.

Figure 7:
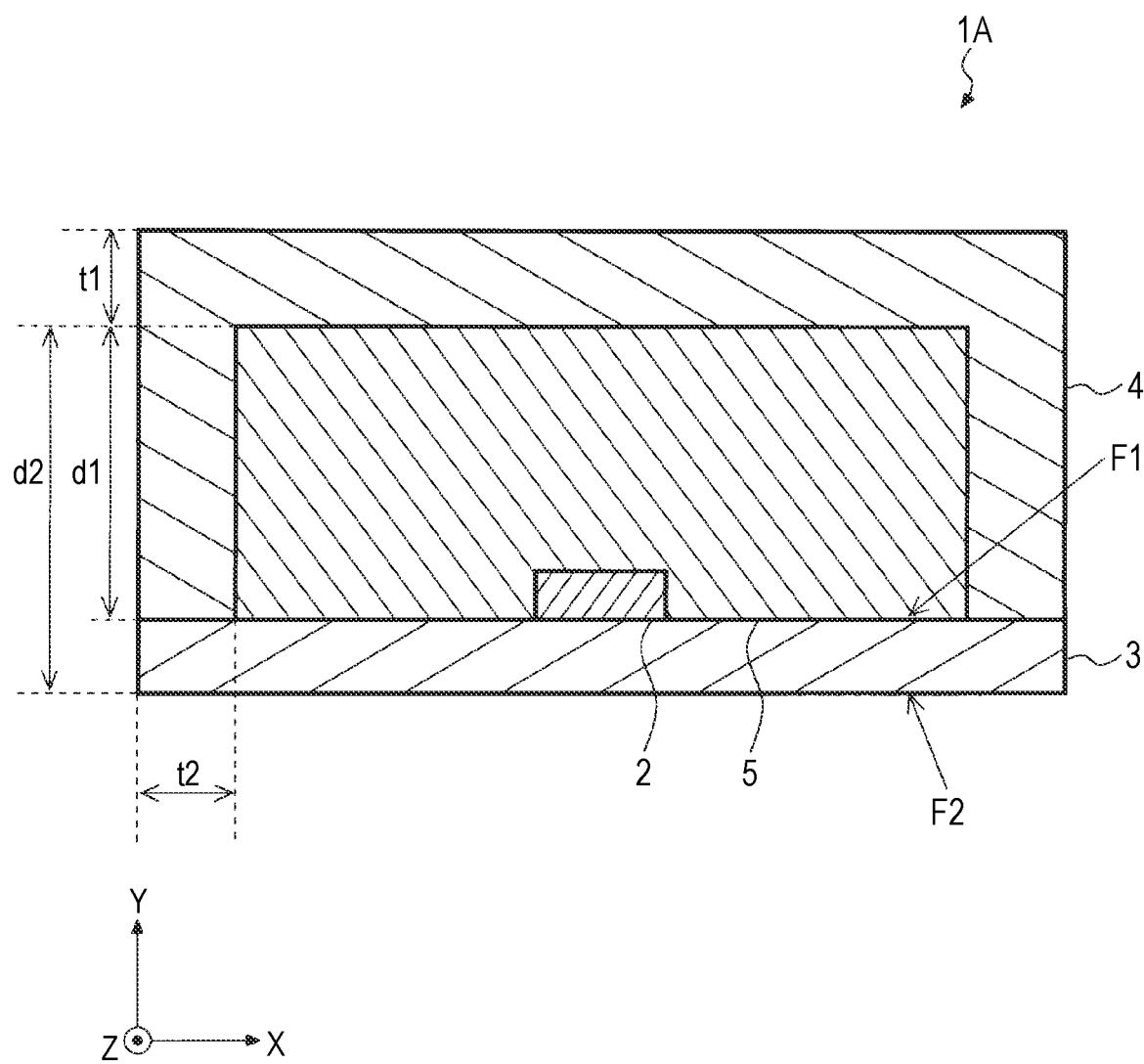
FIG. 7 illustrates a first modification of the antenna device.

FIG. 7 illustrates a first modification of the antenna device 1. An antenna device 1A illustrated in FIG. 7 has a configuration in which an interposition member 5 is added to the antenna device 1. The interposition member 5 is interposed between the cover 4 and the substrate 3. The interposition member 5 occupies a space (except for the region occupied by the element which is the antenna 2 or the like provided on the covered surface F1 of the substrate 3) surrounded by the cover 4 and the covered surface F1 of the substrate 3.

The interposition member 5 may improve a mechanical strength of the antenna device 1A.

The interposition member 5 is formed of, for example, resin. A dielectric constant of the interposition member 5 is different from both the dielectric constant of the substrate 3 and a dielectric constant of the cover 4. In the antenna device 1A, the radio wave W may propagate along the X axis between the cover 4 and the substrate 3, in other words, inside the interposition member 5. Therefore, the distance d1 is preferably smaller than ½ of an effective wavelength λg' of the radio wave W in the interposition member 5. Accordingly, the radio wave W may be prevented from propagating along the X axis inside the interposition member 5, so that the radiation pattern in the direction parallel to the X axis may be prevented from being distorted.

In the antenna device 1A, as in the antenna device 1, for example, when the dielectric constant of the substrate 3 is relatively low and a structure (not illustrated) formed of a conductor is in contact with the opposite surface F2, the radio wave W may propagate along the X axis between the cover 4 and the structure in contact with the opposite surface F2. Therefore, the distance d2 is preferably smaller than ½ of the effective wavelength λg' of the radio wave W in the interposition member 5. Accordingly, the distance d2 is smaller than the cutoff wavelength of the radio wave W propagating along the X axis between the cover 4 and the structure in contact with the opposite surface F2. As a result, the radio wave W may be prevented from propagating along the X axis between the cover 4 and the structure in contact with the opposite surface F2.

Figure 8:
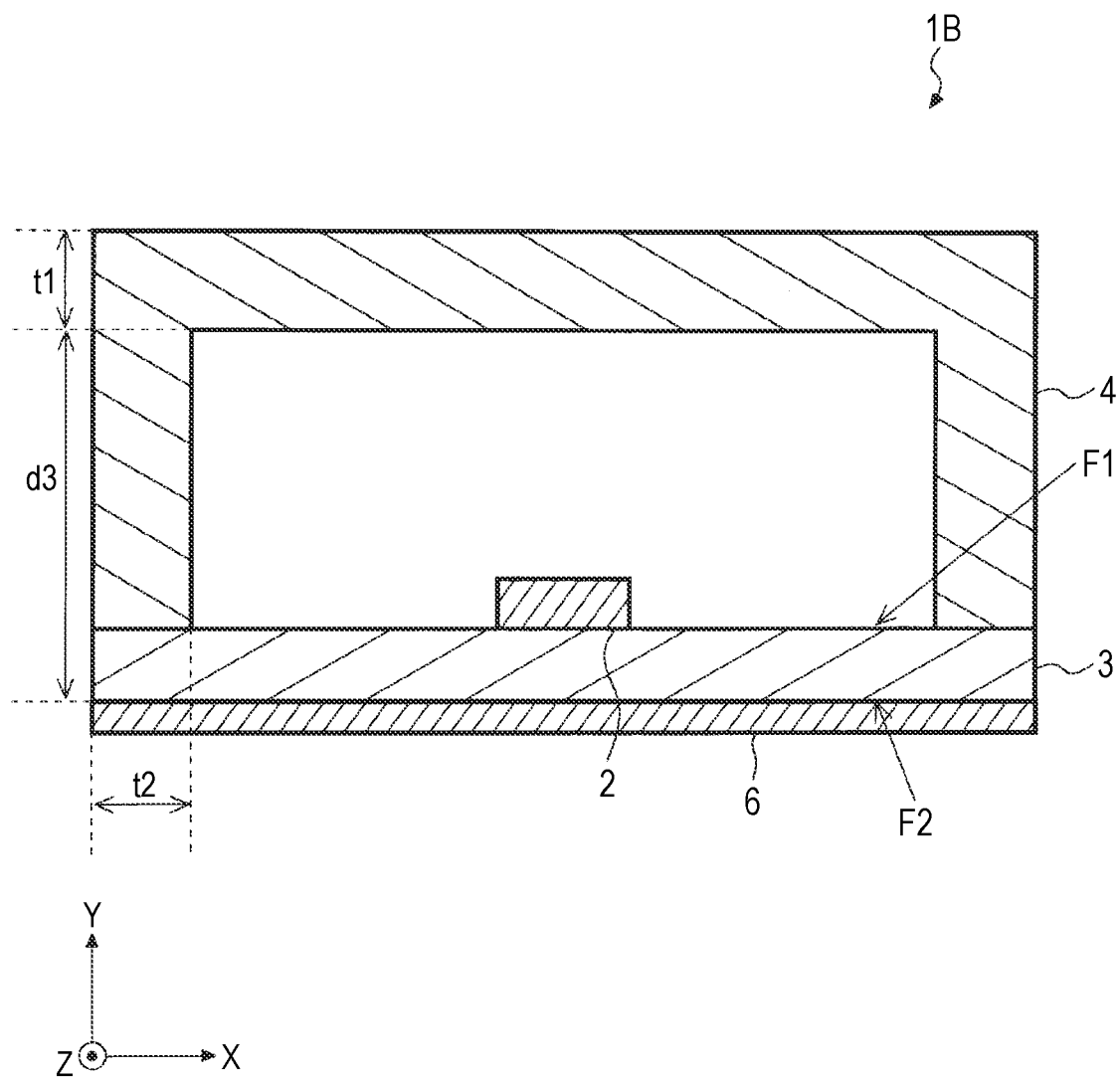
FIG. 8 illustrates a second modification of the antenna device.

FIG. 8 illustrates a second modification of the antenna device 1. An antenna device 1B illustrated in FIG. 8 has a configuration in which a ground pattern 6 is added to the antenna device 1. The ground pattern 6 is provided at the opposite surface F2 of the substrate 3. Unlike the present modification, the ground pattern 6 may be provided in the substrate 3. The ground pattern 6 is formed of a conductor which is copper, copper alloy, aluminum, or aluminum alloy. The ground pattern 6 is grounded.

For example, when the dielectric constant of the substrate 3 is relatively low, the radio wave W may propagate along the X axis between the cover 4 and the ground pattern 6. Therefore, a maximum distance d3 (hereinafter, abbreviated as a "distance d3") between the cover 4 and the ground pattern 6 in the normal direction of the substrate 3 is preferably smaller than ½ of the free space wavelength λ of the radio wave W. Accordingly, the distance d3 is smaller than a cutoff wavelength of the radio wave W propagating along the X axis between the cover 4 and the ground pattern 6. As a result, the radio wave W may be prevented from propagating along the X axis between the cover 4 and the ground pattern 6.

Figure 9:
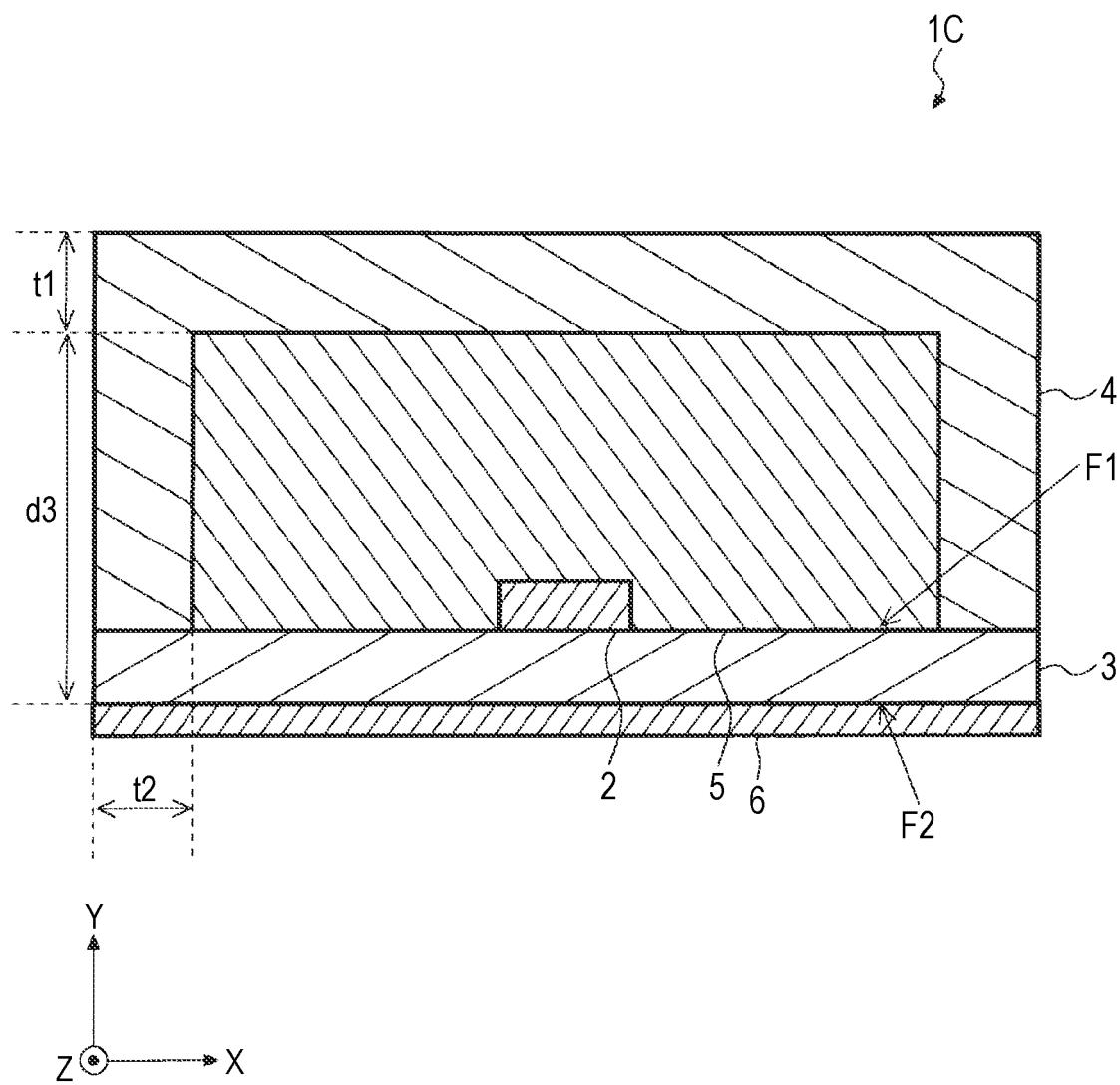
FIG. 9 illustrates a third modification of the antenna device.

FIG. 9 illustrates a third modification of the antenna device 1. An antenna device 1C illustrated in FIG. 9 has a configuration in which an interposition member 5 is added to the antenna device 1B. The interposition member 5 provided in the antenna device 1C is the same as the interposition member 5 provided in the antenna device 1A, so that a detailed description thereof will be omitted.

In the antenna device 1C, the radio wave W may propagate along the X axis inside the interposition member 5. Therefore, the distance d3 is preferably smaller than ½ of the effective wavelength λg' of the radio wave W in the interposition member 5. Accordingly, the radio wave W may be prevented from propagating along the X axis inside the interposition member 5, so that the radiation pattern in the direction parallel to the X axis may be prevented from being distorted.

Configurations of the embodiments in the present specification are merely examples of the present invention. The configurations of the embodiments and the modifications may be modified as appropriate without departing from the technical idea of the present invention. A plurality of the embodiments and the modifications may be implemented in combination within a possible range.

What is claimed is:

1. An antenna device comprising:
   an antenna configured to radiate a radio wave;
   a substrate at which the antenna is provided; and
   a cover which covers the substrate from a radiation surface side of the antenna,
   wherein the cover is a dielectric material,
   wherein a maximum distance between the cover and the substrate in a normal direction to the substrate is smaller than ½ of a free space wavelength of the radio wave, and
   wherein a thickness of the cover is smaller than ½ of an effective wavelength of the radio wave in the cover, and
   wherein a dielectric constant of the cover is greater than or equal to a dielectric constant of the substrate.

2. The antenna device according to claim 1, further comprising an interposition member interposed between the cover and the substrate,
   wherein a dielectric constant of the interposition member is different from both the dielectric constant of the substrate and the dielectric constant of the cover, and
   wherein the maximum distance between the cover and the substrate in the normal direction to the substrate is smaller than ½ of an effective wavelength of the radio wave in the interposition member.

3. The antenna device according to claim 1, further comprising a ground pattern provided at the substrate,
   wherein a maximum distance between the cover and the ground pattern in the normal direction to the substrate is smaller than ½ of the free space wavelength of the radio wave.

4. The antenna device according to claim 3, further comprising an interposition member interposed between the cover and the substrate,
   wherein a dielectric constant of the interposition member is different from both the dielectric constant of the substrate and the dielectric constant of the cover, and
   wherein the maximum distance between the cover and the ground pattern in the normal direction to the substrate is smaller than ½ of an effective wavelength of the radio wave in the interposition member.

5. The antenna device according to claim 1,
   wherein the substrate has a covered surface covered with the cover and an opposite surface opposite to the covered surface, and
   wherein a maximum distance between the cover and the opposite surface in the normal direction to the substrate is smaller than ½ of the free space wavelength of the radio wave.

6. The antenna device according to claim 5, further comprising an interposition member interposed between the cover and the substrate,
   wherein a dielectric constant of the interposition member is different from both the dielectric constant of the substrate and the dielectric constant of the cover, and
   wherein the maximum distance between the cover and the opposite surface in the normal direction to the substrate is smaller than ½ of an effective wavelength of the radio wave in the interposition member.

7. The antenna device according to claim 1,
   wherein the antenna device is an in-vehicle antenna device, and
   wherein the antenna is a vertically polarized antenna.

8. The antenna device according to claim 2,
   wherein the antenna device is an in-vehicle antenna device, and
   wherein the antenna is a vertically polarized antenna.

9. The antenna device according to claim 3,
   wherein the antenna device is an in-vehicle antenna device, and
   wherein the antenna is a vertically polarized antenna.

10. The antenna device according to claim 4,
    wherein the antenna device is an in-vehicle antenna device, and
    wherein the antenna is a vertically polarized antenna.

11. The antenna device according to claim 5,
    wherein the antenna device is an in-vehicle antenna device, and
    wherein the antenna is a vertically polarized antenna.

12. The antenna device according to claim 6,
    wherein the antenna device is an in-vehicle antenna device, and
    wherein the antenna is a vertically polarized antenna.

13. The antenna device according to claim 1, wherein the cover is formed to contain at least one of Teflon and glass fibers, and
    wherein the substrate is formed to contain at least one of Teflon and resin.

14. The antenna device according to claim 1, wherein the cover comprises a laminated structure with a plurality of layers, and
    wherein a thickness of each of the plurality of layers is smaller than ½ of the effective wavelength of the radio wave in the cover.

* * * * *